Feb. 14, 1933.  T. L. SHERMAN  1,897,771
CRANKLESS ENGINE
Filed Feb. 14, 1929
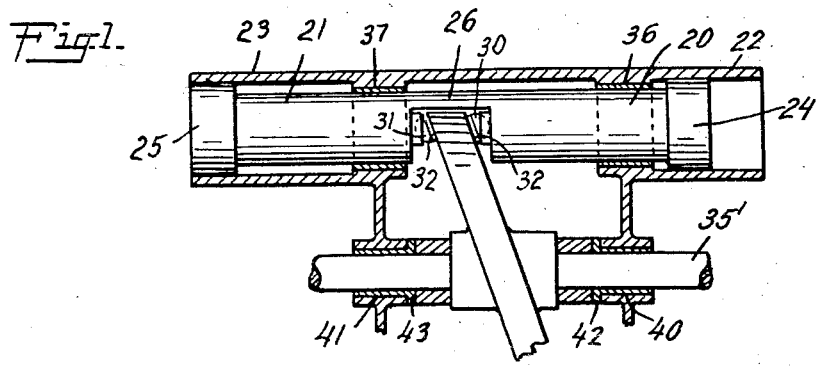
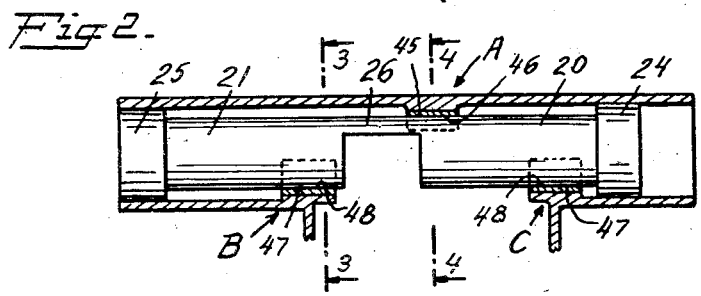
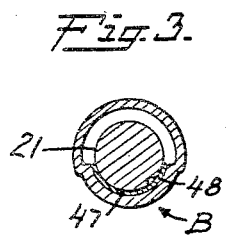 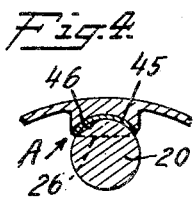 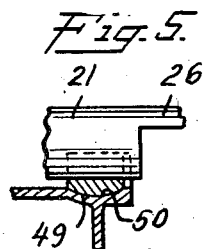 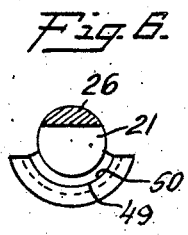
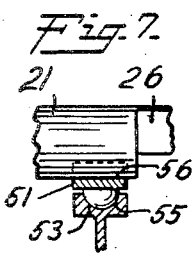 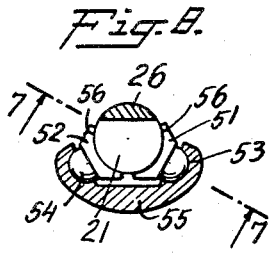 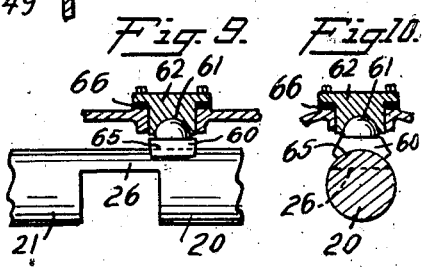
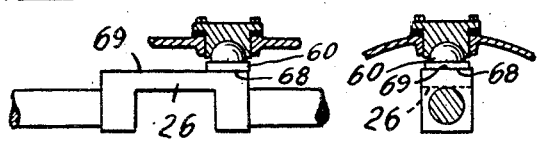 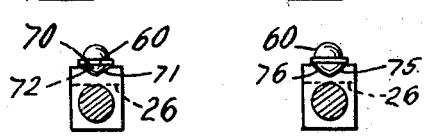
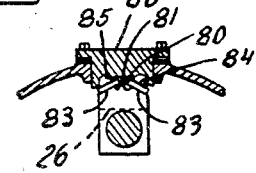
INVENTOR
Thomas L. Sherman
BY
Marshall & Hawley
ATTORNEYS Patented Feb. 14, 1933

1,897,771

UNITED STATES PATENT OFFICE

THOMAS L. SHERMAN, OF NEW YORK, N. Y., ASSIGNOR TO MICHELL-CRANKLESS ENGINES CORPORATION, OF NEW YORK, N. Y., A CORPORATION OF NEW YORK

CRANKLESS ENGINE

Application filed February 14, 1929. Serial No. 339,950.

This invention relates to guide bearings for reciprocating units.

The invention has been particularly worked out in connection with guide bearings for the reciprocating units of a crankless engine and the invention has for its salient object to secure more effective guidance of the reciprocating parts.

Further objects of the invention will appear from the following specification taken in connection with the drawing which forms a part of this application, and in which Fig. 1 is a sectional elevation partly broken away illustrating an existing method of and means for guiding the reciprocating units of a crankless engine;

Fig. 2 is a sectional elevation similar to Fig. 1 but showing guiding bearing means constructed in accordance with the invention;

Fig. 3 is a transverse sectional elevation taken substantially on line 3—3 of Fig. 2.

Fig. 4 is a transverse sectional elevation taken substantially on line 4—4 of Fig. 2.

Fig. 5 is a fragmentary elevational view taken longitudinally of the unit illustrating a slightly different embodiment of one of the guiding bearings;

Fig. 6 is an elevational view partly in section at right angles to Fig. 5;

Fig. 7 is a view similar to Fig. 5 but illustrating another embodiment of the invention, this view being taken substantially on line 7—7 of Fig. 8 in the direction indicated by the arrows thereon;

Fig. 8 is an end elevation partly in section showing the bearing structure illustrated in Fig. 7;

Fig. 9 is an elevational view showing a modified construction of the central bearing member;

Fig. 10 is an end elevation of the structure shown in Fig. 9;

Figs. 11 and 12 are side and end elevations respectively illustrating another embodiment of the central bearing element;

Figs. 13 and 14 are end elevations illustrating further modifications of the central bearing member; and Fig. 15 is an end elevation similar to Figs. 10 and 12 but illustrating a further embodiment of the invention.

The invention briefly described consists of bearing means developed particularly for the reciprocating units of the crankless engine and the bearing means comprises preferably three bearing elements, one of the elements being disposed in sliding bearing engagement with a yoke or connecting portion between the two reciprocating elements or pistons of a crankless engine and the other two bearing elements being disposed at the opposite side of the axis of reciprocation of the units and in sliding bearing engagement with the reciprocating elements. The contacting bearing surfaces are preferably cylindrical although if desired, as shown in certain embodiments of the invention, the contacting surfaces may be flat or inclined. The bearing elements are preferably mounted in such a manner, as by a pivotal mounting, that they will be self-alining.

Further details of the invention will appear from the following description.

Fig. 1 of the drawing illustrates a crankless engine of the type disclosed in Michell reissue Patent No. 15,756, granted February 5, 1924. In this engine there are a plurality of reciprocating units and Fig. 1 shows two such units, 20 and 21. The reciprocating units comprise pistons 24 and 25 reciprocating in cylinders 22 and 23 and connected by a yoke 26.

The pistons 24 and 25 are provided with slipper bearing elements 30 and 31 which are universally pivoted with respect to the pistons and have bearing faces 32 and 33 engaging respectively the opposite sides of a slant or swash plate 35 mounted on a shaft 35'.

In the form of the invention shown in Fig. 1 the pistons 24 and 25 are slidably mounted in cylindrical bearings 36 and 37 at the ends of the cylinders. The shaft 35' is rotatably mounted in bearings 40 and 41 the end thrust being taken by thrust bearing surfaces 42 and 43.

The structure above described is illustrated in the reissue patent referred to and the present invention has for its object to improve the construction and efficiency of the guide bearings for the reciprocating units since in the construction described the cylindircal bearings 36 and 37 which perform the guiding function for the reciprocating units have been found to be not entirely efficient.

In the embodiment of the invention illustrated in Figs. 2, 3 and 4 there are shown three bearing elements A, B and C. The bearing element A is positioned in sliding engagement with the outer cylindrical bearing surface 45 of the yoke 26 and has a cylindrical bearing surface 46 disposed in sliding engagement with the surface 45 of the yoke.

The bearing elements B and C are disposed in sliding engagement with extensions of the pistons 24, 25 respectively and have cylindrical bearing surfaces 47 disposed in sliding engagement with the cylindrical outer surfaces 48 of the piston extensions.

It will be evident that the three bearing elements A, B and C effectively guide the central and side parts of the reciprocating unit.

In the form of the invention illustrated in Figs. 5 and 6 there is shown a slight modification of the construction of the side bearing elements B or C. In this form of construction the bearing element is provided with an outer curved surface 49 which is seated in a correspondingly shaped socket or seat 50. The bearing element shown in Figs. 5 and 6 is slidably mounted in its seat and is therefore self-alining.

In the form of the invention shown in Figs. 7 and 8 each of the side bearings B or C comprises a pair of angularly related slipper bearing elements 51 and 52 having spherical bosses 53 and 54 which are mounted in spherical sockets formed in the frame 55. The slipper bearing elements 51 and 52 have cylindrical inner surfaces 56 engaging the piston. It will be evident that the slipper elements 51 and 52 because of their universal pivotal mounting will be self-alining.

Figs. 9 and 10 illustrate a slipper bearing construction adapted to coact with and guide the yoke 26. In this structure a slipper element 60 is universally pivoted at 61 to a block 62 carried by the engine casing and having a spherical socket receiving the spherical bearing portion 61 of the slipper. The slipper 60 also has a cylindrical bearing surface 65 which slidably engages the cylindrical outer surface of the yoke 26. The block 62 is bolted or otherwise secured to the engine casing and adjustment is provided for by shims 66.

Figs. 11 and 12 illustrate a construction similar to Figs. 9 and 10 but in this form of the invention the slipper element 60 which coacts with the yoke 26 has a flat bearing surface 68 disposed in sliding bearing engagement with a flat upper surface 69 of the yoke.

In Fig. 13 the slipper 60 which coacts with the yoke 26 has a V-shaped portion 70 provided with converging or inclined flat bearing surfaces 71 and 72 which engage correspondingly shaped bearing surfaces formed in a V-shaped groove in the upper surface of the yoke 26.

In Fig. 14 the upper surface of the yoke 26 has concave bearing surfaces 75 and 76 and the slipper 60 coacting therewith has correspondingly shaped convex surfaces.

In the form of the invention shown in Fig. 15 the yoke 26 has inclined bearing surfaces 80 and 81 which are engaged by flat bearing faces 82 and 83 of a pair of slipper elements 84 and 85 universally pivoted in a block 86 carried by the engine casing.

The flat and V-shaped guides illustrated in Figs. 11 to 15, serve the useful purpose of preventing rotation of the reciprocating unit about its own axis, a purpose which is not fulfilled by the guides shown in the other figures.

From the foregoing description it will be clear that simple, practical and efficient guide bearings have been provided for reciprocating units and by means of the bearings the reciprocating units will be guided in a true reciprocating path and will be effectively prevented from getting out of alinement. In the majority of the embodiments to the invention the bearing elements are universally pivoted and therefore are self-alining.

Although certain specific embodiments of the invention have been particularly shown and described it will be evident that the invention is capable of further modification and that further changes in the construction and arrangement of the various cooperating parts may be made without departing from the spirit or scope of the invention as expresed in the following claims.

What I claim is:

1. In combination, a reciprocating unit comprising a pair of oppositely acting pistons, means connecting said pistons, bearing means slidably engaging the outer surface of said connecting means on one side of the axis of reciprocation of said pistons and bearing means engaging said piston connecting means at points spaced longitudinally of said axis and on the opposite side of the axis from said first named bearing means.

2. In combination, a reciprocating unit comprising a pair of oppositely acting pistons, means connecting said pistons, bearing means slidably engaging the outer surface of said connecting means on one side of the axis of reciprocation of said pistons and bearing means engaging said piston connecting means at points spaced longitudinally of said axis and on the opposite side of the axis from said first named bearing means, all of said bearing means having cylindrical bearing surfaces engaging said connecting means and said pistons.

3. In combination, a reciprocating unit comprising a pair of oppositely acting pistons, a yoke rigidly connecting said pistons, bearing means engaging the surface of said yoke on one side of the axis of reciprocation of said pistons and bearing means engaging said piston connecting means at points spaced longitudinally of said axis and on the opposite side of the axis from said first named bearing means.

4. In combination, a reciprocating unit comprising a pair of oppositely acting pistons, means connecting said pistons, bearing means slidably engaging the outer surface of said connecting means on one side of the axis of reciprocation of said pistons and a plurality of bearing means engaging said piston connecting means at points spaced longitudinally of said axis and on the opposite side of the axis from said first named bearing means.

5. In combination, a reciprocating unit comprising a pair of oppositely acting pistons, means connecting said pistons, bearing means engaging said connecting means on one side of the axis of reciprocation of said pistons and a plurality of pivoted bearing means engaging said piston connecting means at points spaced longitudinally of said axis and on the opposite side of the axis from said first named bearing means.

6. In combination, a reciprocating unit comprising a pair of oppositely acting pistons, means connecting said pistons, bearing means engaging said connecting means on one side of the axis of reciprocation of said pistons and a plurality of pivoted bearing means engaging said piston connecting means at points spaced longitudinally of said axis and on the opposite side of the axis from said first named bearing means, all of said bearing means having cylindrical bearing surfaces engaging said connecting means and said pistons.

7. In combination, a reciprocating unit comprising a pair of oppositely acting pistons, means connecting said pistons, bearing means engaging said connecting means on one side of the axis of reciprocation of said pistons and bearing means engaging said piston at points spaced longitudinally of said axis and on the opposite side of the axis from said first named bearing means, said bearing means being self-alining to position the bearing surfaces parallel to the axis of reciprocation of the reciprocating pistons.

8. In combination, a pair of oppositely acting pistons having extensions thereon, a yoke connecting the piston extensions, bearing means engaging the outer surface of the yoke and a pair of bearing members engaging each piston extension, said pairs being disposed on the opposite side of the axis of reciprocation.

9. In combination, a pair of oppositely acting pistons having extensions thereon, a yoke connecting the pistons, bearing means engaging the yoke and a pair of pivoted bearing members engaging each piston extension, said pairs being disposed on the opposite side of the axis of reciprocation.

10. In combination, a pair of oppositely acting pistons having extensions thereon, a yoke connecting the piston extensions, pivoted bearing means engaging the yoke and a pair of pivoted bearing members engaging each piston extension, said pairs being disposed on the opposite side of the axis of reciprocation.

11. In combination, a pair of oppositely acting pistons having extensions thereon, a yoke connecting the piston extensions, bearing means engaging the yoke and a pair of bearing members engaging each piston extension, said pairs being disposed on the opposite side of the axis of reciprocation, said bearing means and said bearing members being mounted for universal pivotal movement.

12. In combination, a reciprocation unit comprising a pair of oppositely acting pistons, means connecting said pistons, bearing means engaging said connecting means on one side of the axis of reciprocation of said pistons and bearing means engaging said connecting means at points spaced longitudinally of said axis and on the opposite side of the axis from said first named bearing means, all of said bearing means being mounted for universal pivotal movement.

THOMAS L. SHERMAN.